US011984119B2

(12) United States Patent
Kwon et al.

(10) Patent No.: US 11,984,119 B2
(45) Date of Patent: *May 14, 2024

(54) ELECTRONIC DEVICE AND VOICE RECOGNITION METHOD THEREOF

(71) Applicant: SAMSUNG ELECTRONICS CO., LTD., Suwon-si (KR)

(72) Inventors: Nam-yeong Kwon, Anyang-si (KR);
Hee-seob Ryu, Hwaseong-si (KR);
Kyung-mi Park, Suwon-si (KR);
Chan-sik Bok, Incheon (KR);
Chan-hee Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 167 days.

This patent is subject to a terminal disclaimer.

(21) Appl. No.: 17/237,269

(22) Filed: Apr. 22, 2021

(65) Prior Publication Data

US 2021/0264914 A1     Aug. 26, 2021

Related U.S. Application Data

(63) Continuation of application No. 16/386,705, filed on Apr. 17, 2019, now Pat. No. 11,011,172, which is a
(Continued)

(30) Foreign Application Priority Data

Jan. 21, 2014     (KR) ..................... 10-2014-0007386

(51) Int. Cl.
*G10L 15/22* (2006.01)
*G10L 15/08* (2006.01)
*G10L 17/22* (2013.01)

(52) U.S. Cl.
CPC .............. *G10L 15/22* (2013.01); *G10L 17/22* (2013.01); *G10L 2015/088* (2013.01); *G10L 2015/223* (2013.01)

(58) Field of Classification Search
CPC ... G10L 15/22; G10L 17/22; G10L 2015/088; G10L 2015/223
See application file for complete search history.

(56) References Cited

U.S. PATENT DOCUMENTS 5,777,571 A     7/1998  Chuang
5,983,186 A     11/1999 Miyazawa et al.
(Continued)

FOREIGN PATENT DOCUMENTS

CN     101405739 A     4/2009
CN     101441869 A     5/2009
(Continued)

OTHER PUBLICATIONS

"Great Moments in Star trek History—Hello, Computer", YouTube, Sep. 1, 2012, Retrieved from the internet: URL:https://www.youtube.com/watch?v=QpWhugUmV5U. XP054978226. (2 pages total).
(Continued)

*Primary Examiner* — Kevin Ky
(74) *Attorney, Agent, or Firm* — Sughrue Mion, PLLC

(57)     ABSTRACT

An electronic device and a voice recognition method thereof are provided. A voice recognition method of an electronic device includes receiving trigger voice, storing a characteristic of the trigger voice for voice verification by analyzing the trigger voice. When a user issues a voice command, determining whether the user voice command comprises the characteristic belonging to the trigger voice, and performing function of the electronic device corresponding to the user
(Continued)

voice command based on the determination. Accordingly, users may easily use the voice recognition function of the electronic device.

12 Claims, 10 Drawing Sheets

Related U.S. Application Data continuation of application No. 14/508,105, filed on Oct. 7, 2014, now Pat. No. 10,304,443.

(56) References Cited

U.S. PATENT DOCUMENTS

| | | | |
|---|---|---|---|
| 6,323,911 B1* | 11/2001 | Schein | H04N 21/4316 348/564 |
| 6,762,682 B2* | 7/2004 | Okamoto | G06K 19/07786 361/679.01 |
| 6,762,692 B1* | 7/2004 | Mingot | G10L 15/22 704/E15.04 |
| 6,839,670 B1 | 1/2005 | Stammler et al. | |
| 7,529,665 B2 | 5/2009 | Kim et al. | |
| 7,756,710 B2 | 7/2010 | Franco | |
| 9,020,823 B2 | 4/2015 | Hoepken et al. | |
| 9,619,200 B2 | 4/2017 | Chakladar et al. | |
| 10,304,443 B2* | 5/2019 | Kwon | G10L 15/22 |
| 10,347,246 B2 | 7/2019 | Lee et al. | |
| 11,011,172 B2* | 5/2021 | Kwon | G10L 17/22 |
| 2001/0056364 A1 | 12/2001 | Diederiks et al. | |
| 2002/0035477 A1 | 3/2002 | Schroder et al. | |
| 2002/0072912 A1 | 6/2002 | Yen et al. | |
| 2003/0095212 A1* | 5/2003 | Ishihara | G08C 23/04 704/E15.045 |
| 2006/0074658 A1* | 4/2006 | Chadha | G10L 17/00 704/E15.045 |
| 2006/0277050 A1* | 12/2006 | Kaneko | G10L 15/26 704/E15.045 |
| 2008/0049905 A1 | 2/2008 | Seo | |
| 2009/0299752 A1* | 12/2009 | Rodriguez | G06F 40/242 704/E15.001 |
| 2011/0145000 A1 | 6/2011 | Hoepken et al. | |
| 2011/0254846 A1 | 10/2011 | Lee et al. | |
| 2012/0089392 A1* | 4/2012 | Larco | G10L 15/22 704/E21.001 |
| 2012/0162540 A1* | 6/2012 | Ouchi | G10L 15/30 704/251 |
| 2012/0179472 A1 | 7/2012 | Ryu et al. | |
| 2012/0226502 A1* | 9/2012 | Ouchi | H04N 21/439 704/E21.001 |
| 2013/0179173 A1 | 7/2013 | Lee et al. | |
| 2013/0218572 A1* | 8/2013 | Cho | G10L 15/22 704/E21.001 |
| 2013/0289992 A1 | 10/2013 | Harada | |
| 2013/0290001 A1* | 10/2013 | Yun | H04N 21/4415 704/275 |
| 2013/0325484 A1 | 12/2013 | Chakladar et al. | |
| 2013/0339015 A1 | 12/2013 | Lee et al. | |
| 2014/0028826 A1* | 1/2014 | Lee | G10L 15/25 348/77 |
| 2014/0168130 A1* | 6/2014 | Hirai | G06F 3/02 345/173 |
| 2014/0181865 A1* | 6/2014 | Koganei | H04N 21/4312 725/38 |
| 2014/0229184 A1* | 8/2014 | Shires | H04L 12/282 704/275 |
| 2014/0249817 A1* | 9/2014 | Hart | G06F 3/167 704/254 |
| 2015/0073799 A1 | 3/2015 | Sun | |
| 2015/0100322 A1* | 4/2015 | Lee | H04N 21/42204 704/275 |
| 2015/0187354 A1* | 7/2015 | Kim | G10L 15/22 704/246 |
| 2015/0221307 A1* | 8/2015 | Shah | G06F 1/3293 704/253 |
| 2015/0261496 A1* | 9/2015 | Faaborg | G10L 15/00 715/728 |
| 2015/0262005 A1* | 9/2015 | Ohmura | G06F 3/011 348/77 |
| 2015/0373393 A1* | 12/2015 | Lee | H04N 21/41265 704/275 |
| 2017/0162198 A1 | 6/2017 | Chakladar et al. | |
| 2019/0035399 A1 | 1/2019 | Chakladar et al. | |
| 2019/0244619 A1* | 8/2019 | Kwon | G10L 15/22 |
| 2021/0264914 A1* | 8/2021 | Kwon | G10L 17/22 |

FOREIGN PATENT DOCUMENTS

| | | |
|---|---|---|
| CN | 102054481 A | 5/2011 |
| CN | 102710539 A | 10/2012 |
| CN | 102833634 A | 12/2012 |
| CN | 103024530 A | 4/2013 |
| CN | 103208283 A | 7/2013 |
| CN | 103310788 A | 9/2013 |
| CN | 103456306 A | 12/2013 |
| CN | 103477342 A | 12/2013 |
| CN | 103491411 A | 1/2014 |
| CN | 103516854 A | 1/2014 |
| EP | 2683204 A1 | 1/2014 |
| JP | 2003-029785 A | 1/2003 |
| JP | 2003-255987 A | 9/2003 |
| JP | 2008-158328 A | 7/2008 |
| JP | 2013-529794 A | 7/2013 |
| KR | 10-2004-0061070 A | 7/2004 |
| KR | 10-2006-0070603 A | 6/2006 |
| KR | 10-0737358 B1 | 7/2006 |
| KR | 10-2007-0061266 A | 6/2007 |
| KR | 10-1022519 B1 | 3/2011 |
| KR | 10-2013-0078483 A | 7/2013 |
| WO | 2004061818 A2 | 7/2004 |
| WO | 2011/163538 A1 | 12/2011 |
| WO | 2012129231 A1 | 9/2012 |

OTHER PUBLICATIONS

Communication dated Apr. 8, 2021 by the European Patent Office in corresponding European Application No. 14 879 385.4.

Communication dated Mar. 11, 2021 by the Korean Intellectual Property Office in corresponding Korean Application No. 10-2021-0010879.

Communication dated Mar. 23, 2017, issued by the European Patent Office in counterpart European Application No. 14879385.4.

Communication dated Oct. 26, 2020, issued by the Korean Patent Office for Korean Patent Application No. 10-2014-0007386.

Communication dated Sep. 23, 2019, from the State Intellectual Property Office of People's Republic of China in counterpart Application No. 201480061513.1.

Communication dated Apr. 19, 2018 by the European Patent Office in counterpart European Patent Application No. 14879385.4.

Search Report dated Feb. 24, 2015, issued by the International Searching Authority in counterpart International Application No. PCT/KR2014/012507.

Written Opinion dated Feb. 24, 2015, issued by the International Searching Authority in counterpart International Application No. PCT/KR2014/012507.

Yusuke Hioka et al: "Estimating direct-to-reverberant energy ratio based on spatial correlation model segregatng direct sound and reverberation", Acoustics Speech and Signal Processing (ICASSP), 2010 IEEE International Conference ON, IEEE, Piscataway, NJ, USA, Mar. 14, 2010 (Mar. 14, 2010), pp. 149-152, XP031698021, (4 pages total).

Kinnunen T et al: "An overview of text-independent speaker recognition: From features to supervectors", Speech Communication Elsevier Science Publishers, Amsterdam, NL, vol. 52, No. 1, Jan. 1, 2010 (Jan. 1, 2010) pp. 12-40, XP026699600, (29 pages total).

Communication dated Mar. 18, 2019, issued by the State Intellectual Property Office of P.R. China in counterpart Chinese Application No. 201480061513.1.

(56) References Cited

OTHER PUBLICATIONS

Communication dated Sep. 16, 2021 by the Korean Intellectual Property Office in counterpart Korean Patent Application No. 10-2021-0010879.
Communication (Brief Communication) dated Apr. 26, 2023, issued by the European Patent Office in counterpart European Application No. 14879385.4.
Communication (Minutes of Oral Proceedings) dated Jun. 16, 2023, issued by the European Patent Office in counterpart European Application No. 14879385.4.
Communication (Decision to Refuse) dated Jun. 19, 2023, issued by the European Patent Office in counterpart European Application No. 14879385.4.
Communication dated Dec. 14, 2022 issued by the European Patent Office in counterpart European Patent Application No. 14879385.4.
Communication dated Dec. 22, 2023, issued by the European Patent Office in counterpart European Application No. 23192250.1.
Communication dated Jan. 26, 2024, issued by the China National Intellectual Property Administration in counterpart Chinese Application No. 202011555902.3.

* cited by examiner

ELECTRONIC DEVICE AND VOICE RECOGNITION METHOD THEREOF

CROSS-REFERENCE TO RELATED APPLICATIONS

This application is a Continuation Application of U.S. application Ser. No. 16/386,705, filed on Apr. 17, 2019, which is a Continuation Application of U.S. application Ser. No. 14/508,105, filed on Oct. 7, 2014, which claims priority from Korean Patent Application No. 10-2014-0007386, filed on Jan. 21, 2014, in the Korean Intellectual Property Office, the disclosure of which is incorporated herein by reference in its entirety.

BACKGROUND

Field

Apparatuses and methods consistent with exemplary embodiments relate to an electronic device and a voice recognition method thereof, and more particularly, to an electronic device and a method for performing voice recognition using a trigger voice.

Description of the Related Art

Convenient use of electronic devices is desirable. Accordingly, there has been continued development of technology for conveniently controlling electronic devices. The technology for conveniently controlling electronic devices started from a method for controlling an electronic device using an input unit provided on/attached to the electronic device and has developed to a method for controlling an electronic device using a remote controller which can control the electronic device from a short distance. As the use of electronic devices including a display with a touch panel has been increasing rapidly, technology for controlling an electronic device using a touch input has been increasingly used.

However, in order to control an electronic device by touch, users always have to be within an arm's length distance to be able to touch the electronic device. Accordingly, a need for controlling an electronic device at a short distance without an external device such as a remote controller, with or without a touch screen, has increased.

As a result, voice recognition technology has been developed. However, voice recognition technology is inefficient as it is easily disrupted by external noises (e.g. a pet's sound, noise from other electronic devices, etc.) as well as a user's voice. Accordingly, in order to use the voice recognition technology to respond only to the user's voice, a method of pressing a button provided on an electronic device or a remote controller has been developed, and is used whenever the user issues a vocal command.

However, because the user has to press a button provided on an electronic device or a remote controller every time the user issues a voice command, the requirement of being at an arm's length to the electronic remote control device cases is still inconvenience to the user.

Therefore, there is a need for an easy to use voice recognition function which is not disrupted even when there are external noises or when multiple people are present and communicating.

SUMMARY

Exemplary embodiments overcome the above disadvantages and other disadvantages not described above. Also, is the embodiments are not required to overcome the disadvantages described above, and an exemplary embodiment may not overcome any of the problems described above.

The different exemplary embodiments provide an electronic device that enables a user to easily utilize voice recognition function, and a voice recognition method thereof.

According to an aspect of an exemplary embodiment, a voice recognition method of an electronic device includes when a user voice is input, determining whether the input user voice is a trigger voice, when it is determined that the input user voice is the trigger voice, changing a mode of operation of the electronic device to a voice recognition mode, analyzing the received user's voice, and storing at least one characteristic of the user's voice, when a voice command is input to control the electronic device, analyzing the voice command, and comparing an analyzed characteristic of the voice command with the characteristic of the user's voice and performing a function corresponding to the voice command based on the comparison results.

According to another exemplary embodiment, storing includes storing at least one of energy of the user's voice, a frequency bandwidth, a reverberation time (RT) while the user's voice is being input, or a voice signal to noise ratio (SNR).

According to another exemplary embodiment, performing includes, if analysis data of at least one of energy of the voice command, a frequency bandwidth, a reverberation time (RT) while the voice command is being input, and a voice signal to noise ratio (SNR) are within a predetermined range of analysis data of at least one of the energy of the trigger voice, the frequency bandwidth, the RT while the trigger voice is being input, and the voice SNR, performing the function corresponding to the voice command.

According to another exemplary embodiment, comprising includes, if a plurality of users' voices are input, analyzing the plurality of users' voices, and from among the analyzed plurality of users' voices, determining at least one of the analyzed users' voices having at least one characteristic matching the stored at least one characteristic of the user's voice as the voice command, and performing includes performing a function corresponding to the determined voice command.

According to another exemplary embodiment, the method includes, if the analyzed at least one characteristic of the voice command is different from the stored at least one characteristic of the user's voice, bypassing the voice command.

According to another exemplary embodiment, the method includes, if it is determined that the user's voice is the trigger voice, and the electronic device changes its mode of operation to the voice recognition mode, displaying a user interface (UI) indicating activation of the voice recognition mode.

According to another exemplary embodiment, the displaying includes, if the function corresponding to the voice command is performed, displaying an indicator indicating the voice command on the UI.

According to another exemplary embodiment, the trigger voice is a predetermined voice set to change the mode of operation of the electronic device to the voice recognition mode to perform voice recognition.

According to another exemplary embodiment, the user's voice and the voice command are received through a microphone included in at least one of an external device or the electronic device.

According to another exemplary embodiment, the method includes, if the voice command is not input within a predetermined period of time, ending the voice recognition mode.

According to another exemplary embodiment, the determining includes determining that the received user's voice is the trigger voice if the user's voice is a first received voice after pressing a button on an external device.

According to an aspect of an exemplary embodiment, an electronic device includes a voice receiver configured to receive a user's voice, a voice signal analyzer configured to analyze the received user's voice, a storage configured to store at least one characteristic of the user's voice, and a controller configured to determine whether the received user's voice is a trigger voice, and if it is determined that the received user's voice is the trigger voice, change a mode of operation of the electronic device to a voice recognition mode, analyze the received user's voice, and store the at least one characteristic of the user's voice in the storage, wherein if a voice command is input to control the electronic device, the controller is further configured to control the voice signal analyzer to analyze the voice command, compare at least one analyzed characteristic of the voice command with the stored at least one characteristic of the user's voice, and perform a function corresponding to the voice command based on the comparison results.

According to another exemplary embodiment, the controller is further configured to store in the storage at least one of energy of the user's voice, a frequency bandwidth, a reverberation time (RT) the user's voice is being input, or a voice signal to noise ratio (SNR) as the at least one characteristic of the user's voice.

According to another exemplary embodiment, if analysis data of at least one of energy of the voice command, a frequency bandwidth, a reverberation time (RT) the voice command is being input, or a voice signal to noise ratio (SNR) are within a predetermined range of analysis data of at least one of the energy of the trigger voice, the frequency bandwidth, the RT while the trigger voice is being input, and the voice SNR, the controller performs the function corresponding to the voice command.

According to another exemplary embodiment, when a plurality of users' voices are input through the voice receiver, the controller controls the voice signal analyzer to analyze the plurality of users' voices, determines at least one of the plurality of users' voice, having the at least one analyzed characteristic matching the stored at least one characteristic of the user's voice as the voice command, and performs a function corresponding to the determined voice command.

According to another exemplary embodiment, when the analyzed at least one characteristic of the voice command is different from the stored at least one characteristic of the user's voice, the controller bypasses the voice command.

According to another exemplary embodiment, the electronic device further includes display and if it is determined that the user's voice is the trigger voice, and the electronic device changes its mode of operation to the voice recognition mode, the controller controls the display to display a user interface (UI) indicating activation of the voice recognition mode.

According to another exemplary embodiment, when the function corresponding to the voice command is performed, the controller controls the display to display an indicator indicating the voice command on the UI.

According to another exemplary embodiment, the trigger voice is a predetermined voice set to change the mode of operation of the electronic device to the voice recognition mode to perform voice recognition.

According to another exemplary embodiment, the electronic device further includes a communicator, and when the user's voice and the voice command are received through an external device, the controller controls the communicator to receive the user's voice and the voice command.

According to another exemplary embodiment, when the voice command is not input within a predetermined period of time, the controller ends the voice recognition mode.

According to another exemplary embodiment, the controller is further configured to determine that the input user's voice is the trigger voice if the user's voice is the first voice input after pressing a button on an external device.

According to an aspect of an exemplary embodiment, a voice recognition method of an electronic device includes receiving a first voice input, performing speech to text recognition on the received first voice input to obtain a first text, determining if the first text corresponds to a command to enter a voice recognition mode, and if it is determined that the first text corresponds to the command to enter the voice recognition mode: entering the voice recognition mode, storing a first characteristic of the first voice input, receiving a second voice input, performing speech verification on the second voice input by comparing a second characteristic of the second voice input with the first characteristic of the first voice input, and performing a function corresponding to the second voice input if the second characteristic of the second voice input corresponds to the first characteristic of the first voice input.

According to another exemplary embodiment, performing a function corresponding to the second voice input includes performing speech to text recognition on the received second voice input to obtain a second text, and determining if the second text corresponds to a function of the electronic device, and performing the function based on the determination.

According to another exemplary embodiment, the first characteristic and the second characteristic comprise at least one of energy of the user's voice, a frequency bandwidth, a reverberation time (RT) the user's voice is being input, or a voice signal to noise ratio (SNR) as the at least one characteristic of the user's voice.

According to another exemplary embodiment, the second characteristic of the second voice input corresponds to the first characteristic of the first voice input if the first characteristic and the second characteristic are within a predetermined range.

According to another exemplary embodiment, the method further includes exiting the voice recognition mode if the second voice input is not received within a predetermined amount of time.

According to another exemplary embodiment, the method further includes bypassing the second voice input if the second characteristic of the second voice input does not correspond to the first characteristic of the first voice input.

According to the diverse exemplary embodiments, a user may easily use voice recognition function of the electronic device by determining whether a voice said by the user is intentional.

Additional and/or other aspects and advantages will be set forth in part in the description which follows and, in part, will be obvious from the description, or may be learned by practice of the different exemplary embodiments.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF THE EXEMPLARY EMBODIMENTS

Figure 1:
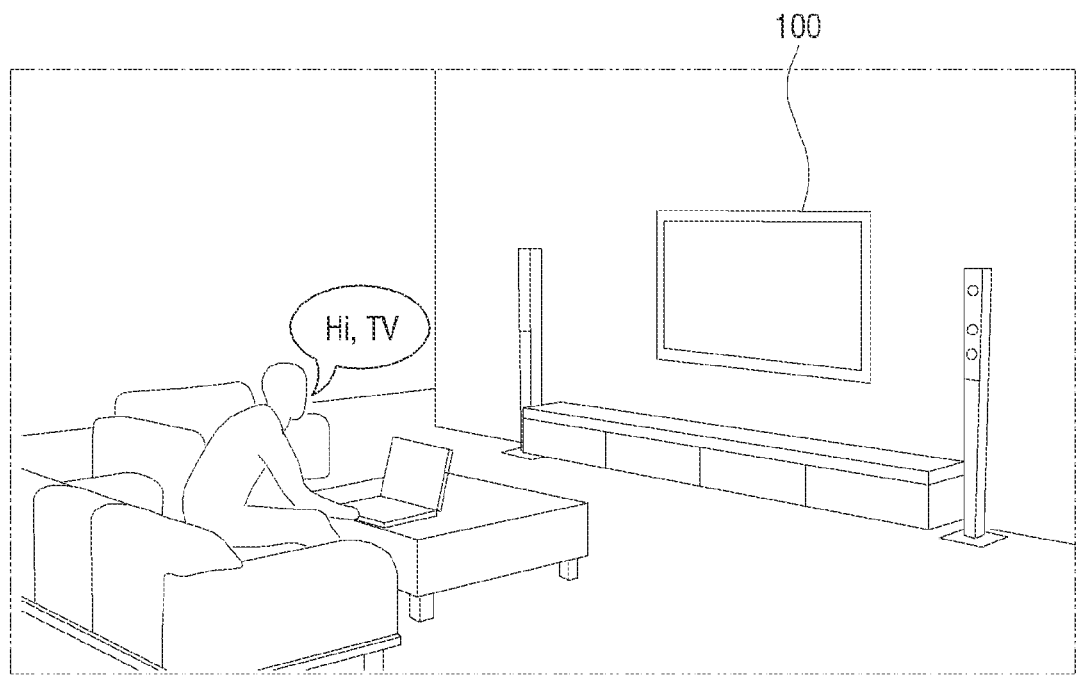
FIG. 1 illustrates a method for inputting trigger voice to an electronic device according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding. Thus, it is apparent that the exemplary embodiments can be carried out without those specifically defined matters. Also, well-known functions or constructions are not described in detail since they would obscure the embodiments with unnecessary detail.

FIG. 1 illustrates a method for inputting trigger voice to an electronic device 100 according to an exemplary embodiment In FIG. 1, a television is used as an embodiment of the electronic device 100 but the electronic device 100 is not limited thereto. One of ordinary skill in the art will understand that numerous different electronic devices (music system, personal computer, gaming systems etc.) can be used as well. The electronic device 100 may be implemented with diverse electronic devices having voice recognition function, such as a mobile phone, a tablet computer, a digital camera, a camcorder, a notebook computer, and a personal digital assistant (PDA).

The electronic device 100 may include a microphone. Thus, the electronic device 100 may receive voice commands from the user within a predetermined distance, analyze the received voice commands, and determine whether the received voice command is the trigger voice. The trigger voice is a predetermined short word/phrase such as "Hi, TV" which triggers a function of the electronic device 100 to be activated.

When it is determined that the received voice is a trigger voice, the electronic device 100 enters into a voice recognition mode. In addition, the electronic device 100 stores a characteristic of the user's voice recorded in the trigger voice.

More specifically, the characteristic of a user's voice may include user voice condition and voice environment. The user voice condition may include energy of the user voice, and frequency band distribution of the user voice. The voice environment may include a reverberation time (RT) while issuing the voice command, or a voice signal to noise ratio (SNR).

That is, the characteristic of user voice may include energy of the user voice, frequency band distribution of the user voice, a reverberation time (RT) while issuing the voice command, and/or a voice signal to noise ratio (SNR).

For example, when the user issues a voice command such as "Hi, TV", the characteristic of the user voice may include energy of the user voice, frequency band distribution according to the user's gender and/or age, an RT of the user's voice according to the location of the electronic device 100, or a voice SNR according to silent interior conditions, existence of a construction site, existence of a pet, or the number of people in the vicinity.

When a user's voice is input, after the result of analysis of the trigger voice is stored as a characteristic of a user's voice, the electronic device 100 analyzes the input user voice and determines whether the input user voice comprise characteristics matching the stored users voice belonging to the stored trigger voice. That is, the electronic device 100 determines whether a characteristic of the input user's voice is similar to the stored characteristic of the stored user's voice belonging to the stored trigger voice.

In addition, when it is determined that the characteristic of the input user's voice is similar to the stored characteristic of the stored user's voice belonging to the stored trigger voice, the electronic device 100 performs voice recognition on the input user's voice. For example, when the user says "Hi, TV" which is stored as trigger voice and then says "Channel 13" with the same characteristics as that of the stored user's voice belonging to the trigger voice, the electronic device 100 changes the channel to channel 13.

Figure 2:
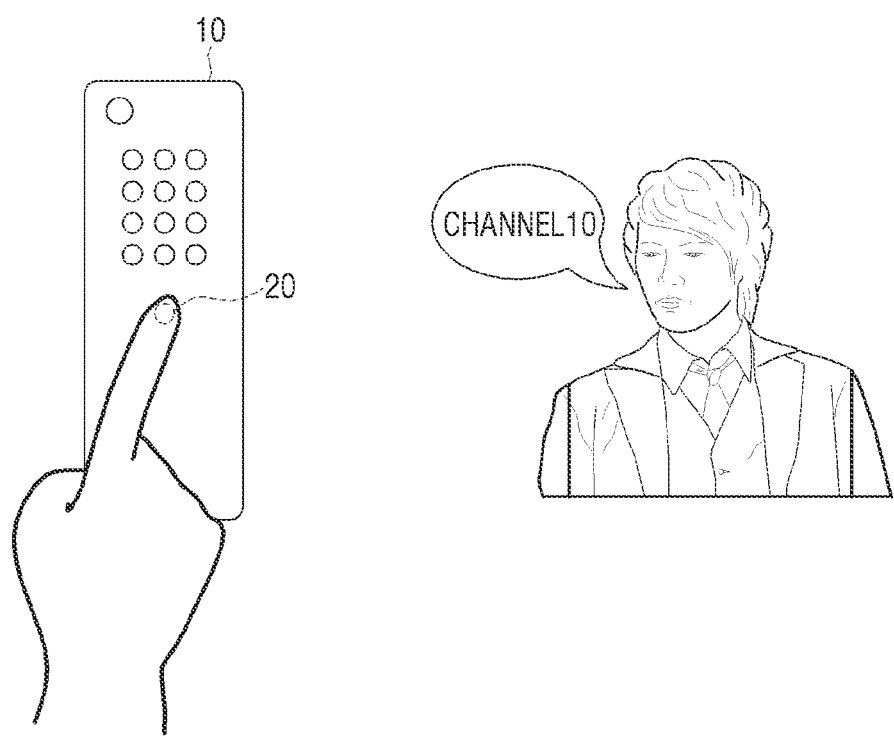
FIG. 2 illustrates a method for inputting trigger voice using an external device according to an exemplary embodiment.

FIG. 2 illustrates a method for inputting trigger voice using an external device/remote controller 10 according to an exemplary embodiment.

In order for the electronic device 100 to receive a user's voice through the remote controller 10 and run voice recognition function, the user presses an input button 20 on the remote controller 10 and issues the voice command, according to an exemplary embodiment. At this time, a user's voice first received after pressing the input button 20 may be stored as the trigger voice. That is, even when words such as "Hi, TV" are predetermined as trigger voice, a user's voice first received after pressing the input button 20 becomes trigger voice since the electronic device 100 receives a signal indicating that a voice is input through the input button 20.

Accordingly, when the user presses the input button 20 and issues a voice command such as "Channel 10" as shown in the embodiment of FIG. 2, the electronic device 100 recognizes "Channel 10" as a trigger voice. Subsequently, the electronic device 100 enters a voice recognition mode in accordance with the trigger voice "Channel 10" and performs voice recognition. Thus, the electronic device 100 changes to channel 10 in the exemplary embodiment illustrated in FIG. 2.

Accordingly, the user may easily use the voice recognition function of the electronic device 100 by issuing a trigger voice command. A specific method for performing voice recognition using the electronic device 100 will be described later.

Figure 3:
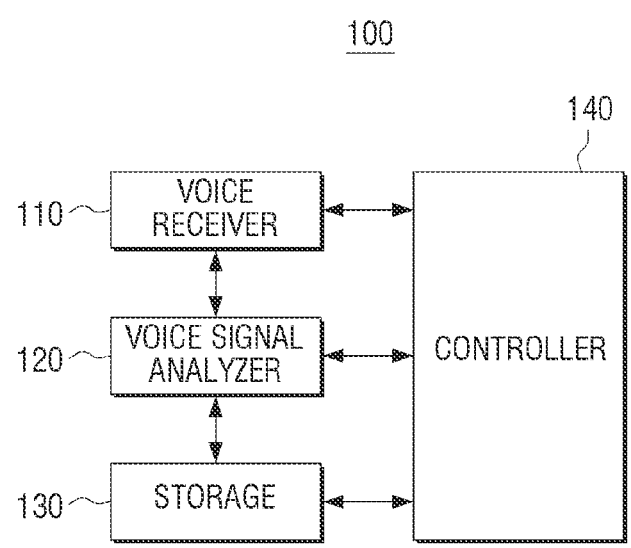
FIG. 3 is a block diagram illustrating an embodiment of an electronic device according to an exemplary embodiment.

FIG. 3 is a block diagram illustrating an embodiment of an electronic device 100 according to an exemplary embodiment. With reference to FIG. 3, the electronic device 100 may include a voice receiver 110, a voice signal analyzer 120, storage 130, and a controller 140. The electronic device 100 may be implemented in diverse electronic devices having voice recognition function, such as a tablet computer, a digital camera, a camcorder, a notebook computer, a PDA, and a mobile phone.

The voice receiver 110 receives a user's voice. The voice receiver 110 may include a microphone (not shown), and receive a user's voice through the microphone. The microphone may be included in the electronic device 100 or may be a part of an external device. For example, the external device may be a remote controller. The remote controller may receive a user's voice through the microphone, and transmit the user's voice to the voice receiver 110 of the electronic device 100.

That is, the voice receiver 110 may receive the user's voice input through the microphone, and process the user's voice into electrical audio data. In addition, the voice receiver 110 may transmit the processed audio data to the voice signal analyzer 120.

The voice signal analyzer 120 analyzes a voice received from the voice receiver 110. For example, the voice signal analyzer 120 analyzes a user's voice to acquire energy, frequency band distribution, or a reverberation time (RT) of the user's voice according to an exemplary embodiment.

When a user's voice is received, noise around the user may also be received. Accordingly, the voice signal analyzer 120 may analyze a user's voice to acquire a user voice signal to noise ratio (SNR).

The storage 130 stores diverse analysis results of the voice signal analyzer 120. More specifically, the storage 130 may store an analyzed characteristic of a user's voice, i.e. energy of the user's voice, frequency band distribution, an RT of the user voice, and/or a user voice SNR.

In addition, the storage 130 stores diverse software modules and data to drive the electronic device 100. For example, the storage 130 may store software including a voice recognition module, a base module, a sensing module, a communication module, a presentation module, a web browser module, and a service module, according to an exemplary embodiment.

The controller 140 controls overall operation of the electronic device 100. In particular, the controller 140 determines whether a user's voice input through the voice receiver 110 is a trigger voice.

The trigger voice is a voice to change the mode of operation of the electronic device 100 into a voice recognition mode to perform voice recognition. More specifically, the trigger voice is a predetermined short word/phrase stored in the electronic device 100. For example, the electronic device 100 may initially set "Hi, TV" as a trigger voice. In other words, the trigger voice may be a user's voice which is predetermined and received through the voice receiver 110 as described above, or may be a user's voice first input after the user presses an input button provided on an external device of the electronic device 100, e.g. a remote controller.

When the controller 140 determines that an input voice is the trigger voice, the controller 140 controls the electronic device 100 enter a voice recognition mode. In addition, the controller 140 controls the voice signal analyzer 120 to analyze the trigger voice, and controls the storage 130 to store a characteristic of the user's voice.

The characteristic of the user's voice may include energy of the user's voice, frequency band distribution, an RT of the user's voice, or a user's voice SNR as analysis result of the voice signal analyzer 120.

In addition, when a voice command is input to control the electronic device 100, the controller 140 controls the voice signal analyzer 120 to analyze the voice command.

The controller 140 compares analyzed characteristics of the voice command with the characteristics of user's voice that is stored in the storage 130. Subsequently, the controller 140 controls the electronic device 100 to perform a function corresponding to the voice command based on the comparison results.

More specifically, when data acquired by analyzing at least one of energy, frequency bandwidth, an RT during the input of the voice command, or a voice SNR of the voice command input through the voice receiver 110 is within a predetermined range of data acquired by analyzing at least one of energy, frequency bandwidth, an RT of the stored trigger voice, and a voice SNR of the user's voice corresponds to the trigger voice, the controller 140 controls the electronic device 100 to perform a function corresponding to the voice command.

In addition, the controller 140 controls the storage 130 to store user's voice condition or user's voice environment of user's voice analyzed by the voice signal analyzer 120 as a characteristic of the user's voice.

The controller 140 finishes voice recognition mode after a predetermined period of time. More specifically, after a user's voice input through the voice receiver 110 is the trigger voice because of which the electronic device 100 enters the voice recognition mode, if a voice command is not input during a predetermined period of time, the controller 140 finishes the voice recognition mode, i.e. controls the electronic device 100 to exit the voice recognition mode.

In addition, when characteristics of a voice command analyzed by the voice signal analyzer 120 is not similar to the characteristics of user's voice stored in the storage 130, the controller 140 bypasses the voice command.

Figure 4:
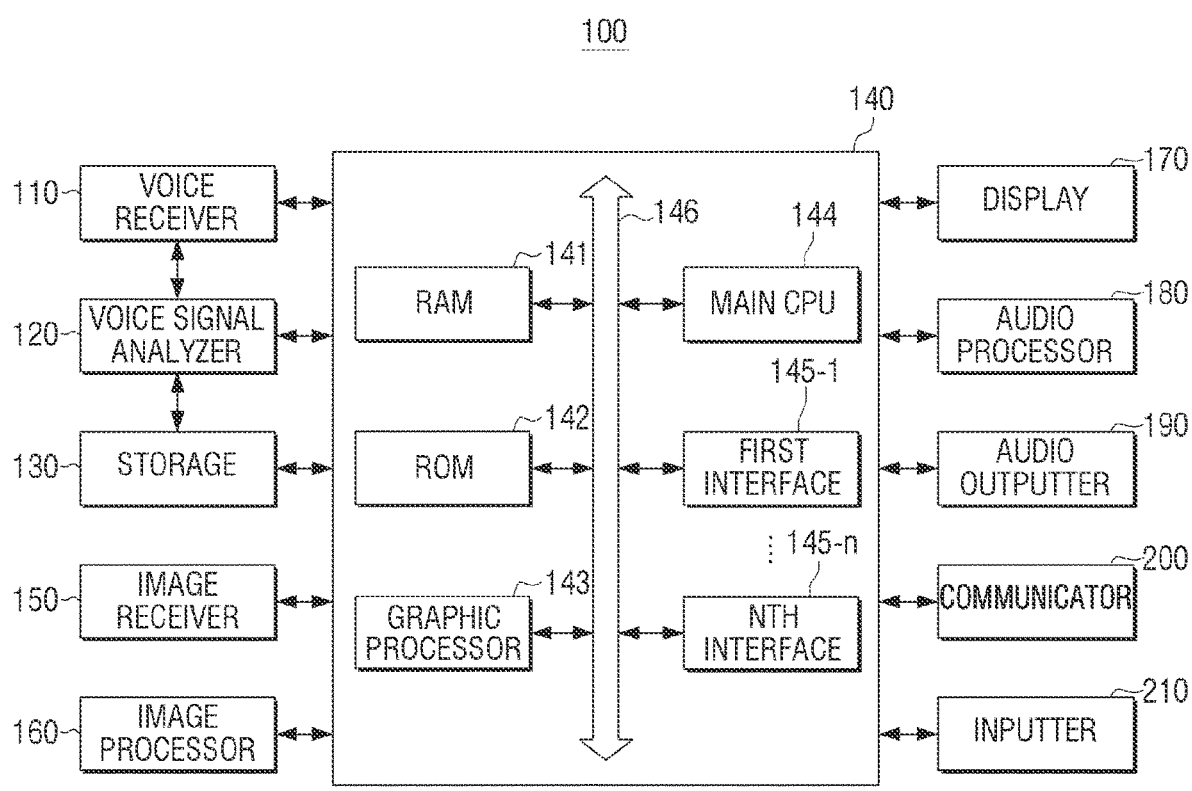
FIG. 4 is a block diagram illustrating another embodiment of an electronic device according to an exemplary embodiment.

With reference to FIG. 4, the electronic device 100 may include a voice receiver 110, a voice signal analyzer 120, storage 130, a controller 140, an image receiver 150, an image processor 160, a display 170, an audio processor 180, an audio outputter 190, a communicator 200, and an inputter 210. FIG. 4 illustrates an embodiment of the electronic device 100 in which the electronic device 100 is a device having diverse functions such as voice recognition function, communication function, video playback function, display function, and the like. According to exemplary embodiments, some of the components shown in FIG. 4 may be omitted or modified, and other components may be added.

The voice receiver 110 receives a user's voice. The voice receiver 110 may include a microphone (not shown), and receive a user's voice through the microphone. The microphone may be included in the electronic device 100 or in an external device. The external device may be a remote controller. The remote controller may receive a user's voice through the microphone, and transmit the user voice to the voice receiver 110.

That is, the voice receiver 110 may receive the user's voice input through the microphone, and may process the user's voice into electrical audio data. In addition, the voice receiver 110 may transmit the processed audio data to the voice signal analyzer 120.

The voice signal analyzer 120 analyzes a voice received through the voice receiver 110. For example, the voice signal analyzer 120 analyzes a user's voice to acquire energy, frequency band distribution, or a reverberation time (RT) of the user's voice.

When a user's voice is received, noise around the user may also be received. Accordingly, the voice signal analyzer 120 may analyze a user's voice to acquire a user's voice signal to noise ratio (SNR).

The storage 130 stores diverse analysis results of the voice signal analyzer 120. More specifically, the storage 130 may store analyzed characteristics of a user's voice, i.e. energy of the user's voice, frequency band distribution, an RT of the user's voice, or a user's voice SNR.

In addition, the storage 130 stores diverse software modules and data to drive the electronic device 100. For example, the storage 130 may store software including a voice recognition module, a base module, a sensing module, a communication module, a presentation module, a web browser module, and a service module, according to an exemplary embodiment.

The controller 140 controls overall operation of the electronic device 100. In particular, the controller 140 determines whether a voice input through the voice receiver 110 is the trigger voice.

The trigger voice is a voice to change the mode of operation of the electronic device 100 into voice recognition mode to perform voice recognition. More specifically, the trigger voice is a predetermined short word/phrase stored in the electronic device 100. For example, the electronic device 100 may initially set "Hi, TV" as trigger voice. In other words, the trigger voice may be a user's voice which is a predetermined word/phrase received through the voice receiver 110 as described above, or may be a user's voice first input after the user presses an input button provided on an external device of the electronic device 100, e.g. a remote controller.

More specifically, if the predetermined word/phrase stored in the electronic device 100 is "Hi, TV", when "Hi, TV" is input through a microphone, the controller 140 changes the mode of operation of the electronic device 100 into voice recognition mode, and controls the voice signal analyzer 120 to analyze the input user's voice "Hi, TV". The microphone may be included in the electronic device 100 or in an external device of the electronic device 100 such as a remote controller. In addition, when a user command of pressing an input button of the remote controller is input and then a voice is first input, the controller 140 may determine that the first input voice is the trigger voice.

That is, when the controller 140 determines that an input voice is the predetermined trigger voice, the controller 140 changes the mode of operation of the electronic device 100 into voice recognition mode, controls the voice signal analyzer 120 to analyze the trigger voice, and controls the storage 130 to store characteristics of the user's voice. For example, the controller 140 controls the storage 130 to store the analysis result of the trigger voice such as energy of the trigger voice, frequency bandwidth, a reverberation time (RT) when saying the voice, and/or a voice signal to noise ratio (SNR).

When a voice command is input through the voice receiver 110 after the electronic device has entered into a voice recognition mode, the controller 140 controls the voice signal analyzer 120 to analyze the voice command. The voice command may include all of the users' voices to control functions of the electronic device 100. In addition, the controller 140 controls the voice signal analyzer 120 to recognize a user's voice having more than a predetermined energy as a voice command, and analyze the user's voice.

For example, when a control voice "channel thirteen" is input through the voice receiver 110 after the electronic device 100 has entered into a voice recognition mode, the controller 140 controls the voice signal analyzer 120 to analyze energy, frequency bandwidth, an RT while the voice command is being input, and/or a voice SNR of the voice command "Channel thirteen".

When analysis results regarding energy, frequency bandwidth, an RT while the voice command is being input, and/or a voice SNR of the control voice "channel thirteen" is within a predetermined range of analysis results regarding energy, frequency bandwidth, an RT while the trigger voice is being input, and/or a voice SNR of the trigger voice stored in the storage 130, the controller 140 performs voice recognition for the voice command and changes the electronic device 100 to channel 13, according to an exemplary embodiment.

In addition, when the user presses an input button of an external device and says "Channel thirteen", the controller 140 determines that "Channel thirteen" is the trigger voice. Subsequently, the controller 140 analyzes "Channel thirteen" based on the aforementioned method, stores the analysis result as a characteristic of the user's voice, and changes the mode of operation of the electronic device 100 to a voice recognition mode. In addition, the controller 140 changes the electronic device 100 to channel 13.

When a voice command "Volume up" is received through the voice receiver 110 after changing to channel 13, the controller 140 analyzes the received voice command using the voice signal analyzer 120, and determines whether the analysis result is within a predetermined range of the characteristic of the user's voice. When the analysis result is within a predetermined range of the characteristic of the user's voice, the controller 140 performs voice recognition and turns up the volume.

When a plurality of users' voices are received after changing into voice recognition mode, the controller 140 controls the voice signal analyzer 120 to analyze each of the users' voices. In addition, the controller 140 determines that among the users' voices, a user voice having analysis result which is similar to the characteristic of user's voice stored in the storage 130 is a voice command. Accordingly, the controller 140 performs voice recognition according to the determined voice command.

For example, if a first user, a second user, and a third user are communicating around the electronic device 100, and the first user issues a predetermined trigger voice "Hi, TV", the voice receiver 110 receives the first user's voice, and the controller 140 changes the mode of operation of the electronic device 100 into a voice recognition mode, and controls the voice signal analyzer 120 to analyze the first user's trigger voice.

More specifically, the voice signal analyzer 120 may analyze energy and frequency band distribution of the first user's voice. In addition, the voice signal analyzer 120 may analyze an RT while the first user's voice is being input and the first user's voice SNR. The controller 140 controls the storage 130 to store the analysis result of the first user's trigger voice as a characteristic of user's voice.

When the first user, the second user, and the third user say "Volume up", "Finish", and "Channel thirteen" respectively after the characteristic of user's voice is stored, and when the voice receiver 110 receives the users' voices, the controller 140 controls the voice signal analyzer 120 to analyze each user's received voice.

The voice signal analyzer 120 analyzes at least one of energy, frequency band distribution, an RT, or an SNR of each user. In addition, the controller 140 compares the analysis result regarding a characteristic of each user's voice with the characteristic of user's voice stored in the storage 130. That is, the controller 140 determines that the analysis result of "Volume up" voice input by the same user (first user) is most similar to the characteristic of user's voice stored in the storage 130, and thus turns up the volume of the electronic device 100 in accordance with the voice command "Volume up" input by the first user.

In addition, the controller 140 bypasses the second and third users' voices having the analysis results which are different from the characteristic of user's voice stored in the storage 130. Thus, although the electronic device 100 receives "Finish" and "Channel thirteen" through the voice receiver 110, the electronic device 100 does not perform their corresponding functions.

When a predetermined period of time has elapsed after voice recognition is performed, the controller 140 may finish the voice recognition session, i.e. control the electronic device 100 to exit the voice recognition mode. In other words, even though the user does not input a command to finish voice recognition, the controller 140 controls the electronic device 100 to finish the voice recognition session when any user's voice including a including a voice command is not received through the voice receiver 110 during a predetermined period of time, according to an exemplary embodiment.

In addition, when a characteristic of a voice command analyzed by the voice signal analyzer 120 is different from the characteristic of user's voice stored in the storage 130, the controller 140 bypasses the voice command.

For example, the controller 140 controls the voice signal analyzer 120 to analyze a user's voice which is determined to be trigger voice, and controls the storage 130 to store energy and a voice SNR of the user's voice as characteristics of the user's voice.

When the voice receiver 110 receives a voice command after the characteristics of the user's voice are stored, the controller 140 determines whether analysis result of the voice command analyzed by the voice signal analyzer 120 is similar to the characteristics of the user's voice stored in the storage 130. When it is determined that energy or a voice SNR of the voice command is different from the characteristics of the user's voice stored in storage 130, the controller 140 bypasses the voice command so that the electronic device 100 may not be controlled in accordance with the voice command as described above.

The image receiver 150 receives image data through diverse sources. For example, the image receiver 150 may receive broadcast data from an external broadcasting station, receive image data from an external server in real time, or receive image data stored in the storage 130, according to exemplary embodiments.

The image processor 160 processes image data received by the image receiver 150. The image processor 160 performs diverse image processing such as decoding, scaling, noise filtering, frame rate conversion, and resolution conversion for image data, according to an exemplary embodiment.

The display 170 displays a video frame processed by the image processor 160 from image data received by the image receiver 150, and at least one of diverse screens generated by a graphic processor 143, according to an exemplary embodiment.

In particular, the display 170 may display a user interface (UI) indicating a voice recognition mode. For example, when "Hi, TV" is input through the voice receiver 110, is analyzed by the voice signal analyzer 120, and is thus determined to be the trigger voice, the display 170 displays a UI indicating that trigger voice has been recognized and that the electronic device 100 has entered a voice recognition mode.

Figure 7:
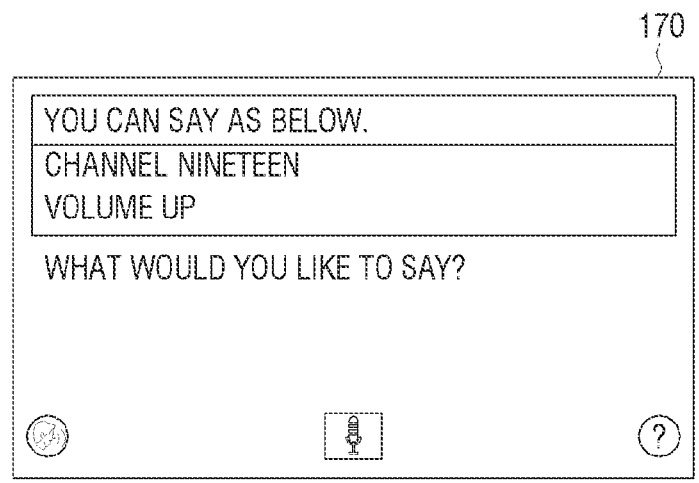
FIGS. 7 to 10 illustrate different examples of User Interfaces (UIs) displayed on the device being controlled via voice recognition, according to an exemplary embodiment.

More specifically, the display 170 may display examples of voice command inputs such as "You can say as below", "Channel nineteen", and "Volume up" as shown in FIG. 7. In addition, the display 170 may display a phrase such as "What would you like to say?", thereby indicating that the electronic device 100 is prepared to receive a voice command.

In addition, in voice recognition mode, when a voice command is input and a function corresponding to the voice command is performed, the display 170 may display an indicator on the UI under the control of the controller 140.

More specifically, in voice recognition mode, when a voice command is input through the voice receiver 110 and is analyzed by the voice signal analyzer 120, the display 170 may display a predetermined color (e.g. white) on a portion of the display 170, or display an indicator flickering in predetermined color (e.g. white) in order to indicate that the voice command is being analyzed, according to exemplary embodiments. One of ordinary skill in the art would understand that an infinite different types of indicators may be displayed on the UI to indicate the information as described above. The display 170 may display diverse types of indicators on the UI indicating voice recognition mode.

Figure 8:
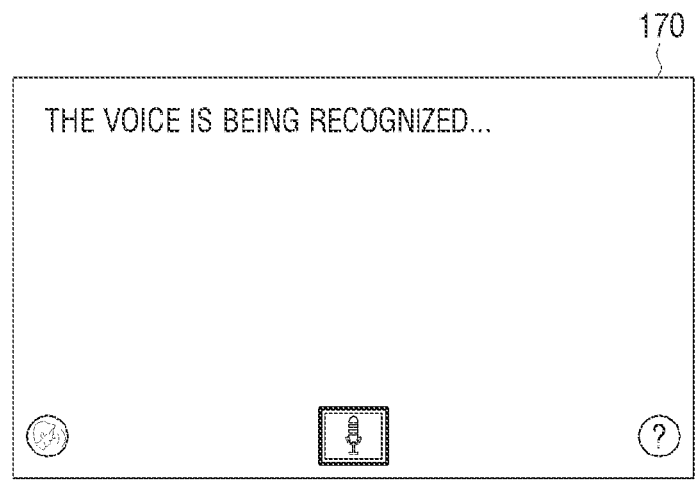

For example, the display 170 may display an indicator of an icon in the shape of a microphone on the UI as shown in FIG. 8. In addition, in order to indicate that a voice is being recognized, the display 170 may display a phrase such as "The voice is being recognized", according to an exemplary embodiment.

Figure 9:
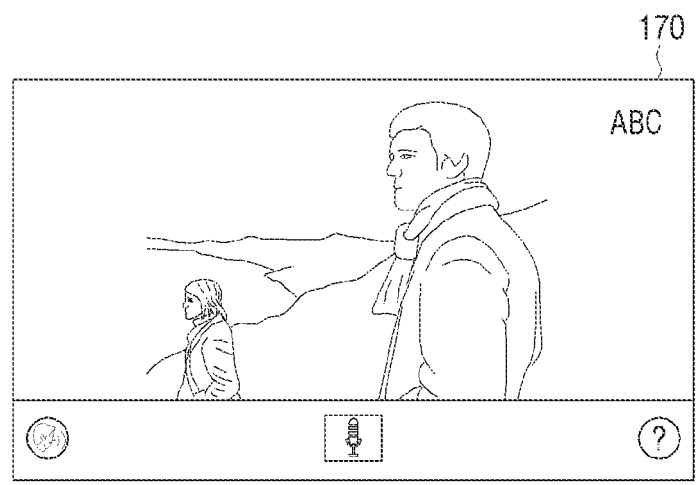

The UI indicating voice recognition mode may be displayed on a portion of the display 170. For example, when trigger voice and a voice command is input, the display 170 may continue to display content, and display a UI indicating voice recognition mode on a portion of the display 170 as shown in FIG. 9, according to an exemplary embodiment.

Figure 10:
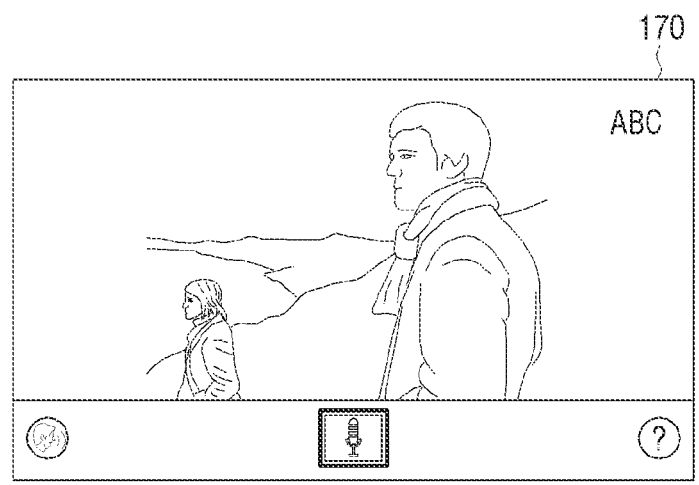

Also, when a voice command is input and is being analyzed, the display 170 may continue to display content, and display an indicator on a UI indicating voice recognition mode on a portion of the display 170 as shown in FIG. 10, according to an exemplary embodiment.

The audio processor 180 processes audio data. The audio processor 180 may perform diverse processing such as decoding, amplification, and noise filtering for audio data. Audio data processed by the audio processor 180 may be output to the audio outputter 190, according to an exemplary embodiment.

The audio outputter 190 outputs diverse notification sounds and voice messages as well as diverse audio data processed by the audio processor 180. The audio outputter 190 may be implemented with a speaker, according to an exemplary embodiment. The audio outputter 190 may be implemented with an audio terminal, according to another exemplary embodiment.

The communicator 200 communicates with diverse types of external devices according to diverse types of communication methods. The communicator 200 may include diverse communication modules such as a universal serial bus (USB) module, a wireless fidelity (Wi-Fi) module, a Bluetooth module, a near field communication (NFC) module, and wireless communication module, according to different exemplary embodiments. The Wi-Fi module, the Bluetooth module, and the NFC module perform communication based on a Wi-Fi method, a Bluetooth method, and an NFC method, respectively. The NFC module is a chip that operates based on the NFC method which uses a 13.56 MHz band among diverse radio frequency identification (RFID) frequency bands such as 135 kHz, 13.56 MHz, 433 MHz, 860-960 MHz, and 2.45 GHz. In the case that the Wi-Fi module or the Bluetooth module is used, diverse connection information, such as a subsystem identification (SSID), and a session key is transmitted and received first, following which diverse information can be transmitted and received.

In addition, when a user's voice or a voice command is input through an external device, the communicator 200 receives the input voice. For example, when a user voice is input through a microphone mounted in a remote controller, the electronic device 100 receives the input voice through the communicator 200.

The inputter 210 receives a user command to control overall operation of the electronic device 100. The inputter 210 may be implemented with a remote controller including 4 direction keys for up, down, left and right directions and a confirmation key, according to an exemplary embodiment. The inputter 210 may be implemented with diverse input devices such as a touch screen, a mouse, a pointing device, and the like.

In addition, if the inputter 210 is a remote controller, the remote controller may include an input button to receive a voice input. The user presses the input button on the remote controller, and inputs a voice command. In addition, a user's voice first received after pressing the input button may be treated as the trigger voice.

The controller 140 may include a random-access memory (RAM) 141, a read-only memory (ROM) 142, a graphic processor 143, a main central processing unit (CPU) 144, first to $N^{th}$ interfaces 145-1 to 145-N, and a bus 146 as shown in FIG. 4. The RAM 141, the ROM 142, the graphic processor 143, the main CPU 144, and the first to $N^{th}$ interfaces 145-1 to 145-N may be connected to one another via the bus 146, according to an exemplary embodiment.

The ROM 142 may store a set of commands to boot up the system. When a turn-on command is input and the power is supplied, the main CPU 144 copies an operating system (OS) stored in the storage 130 to the RAM 141 and executes the OS according to the commands stored in the ROM 142 so that the system can boot up. When the boot-up is complete, the main CPU 144 copies diverse application programs stored in the storage 130, to the RAM 141, and runs the copied application programs so that diverse operations can be performed, according to an exemplary embodiment.

The graphic processor 143 generates a screen including diverse objects such as an icon, an image, and text, using an operator (not shown) and a renderer (not shown). The operator operates on property values of each object, such as a coordinate value, shape, size and color, according to layout of the screen using a control command received from the inputter 210, according to an exemplary embodiment. The renderer generates a screen having diverse layout including objects based on the property values operated on by the operator. The screen generated by the renderer is displayed on a display area of the display 170. In particular, the graphic processor 143 generates a UI indicating that the trigger voice is recognized and that a user's voice can be received, according to an exemplary embodiment.

The main CPU 144 accesses the storage 130 and boots up the system using the OS stored in the storage 130. In addition, the main CPU 144 performs diverse operations using diverse programs, contents, and data stored in the storage 130, according to an exemplary embodiment.

The first to $N^{th}$ interfaces 145-1 to 145-N are connected to the aforementioned components via a bus 146, according to an exemplary embodiment.

Figure 5:
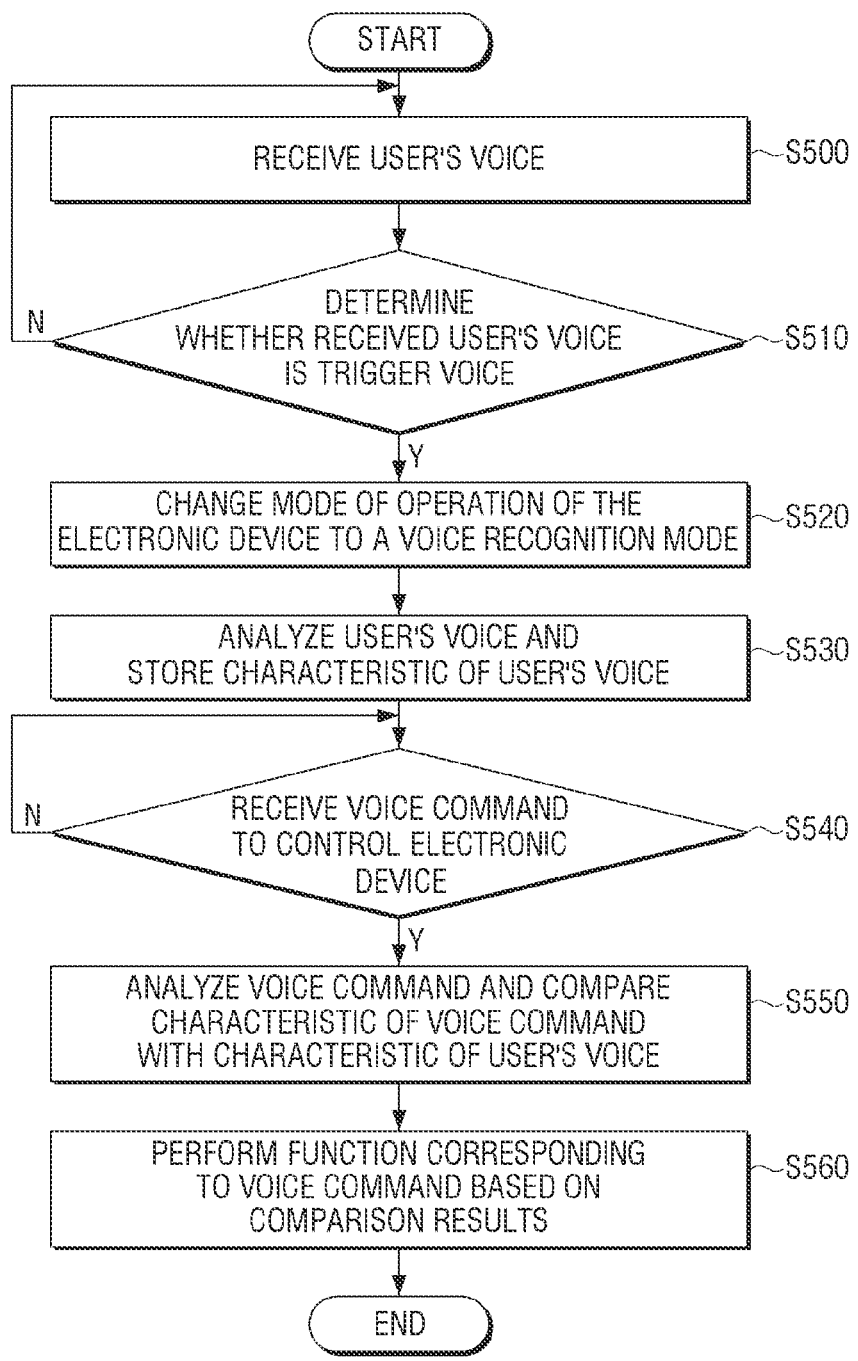
FIG. 5 is a flow chart describing a method for analyzing user's voice and performing voice recognition according to an exemplary embodiment.

FIG. 5 is a flow chart describing a method for analyzing user's voice and performing voice recognition according to an exemplary embodiment.

First, the electronic device 100 receives a user's voice (S500). The electronic device 100 may receive a user's voice through a microphone included in the electronic device 100 or through a microphone included in an external device such as a remote controller.

The electronic device 100 determines whether the received user's voice is the trigger voice (S510). The trigger voice may be a voice to change the mode of operation of the electronic device 100 to a voice recognition mode to perform voice recognition. In addition, the trigger voice may be a predetermined word/phrase stored in the electronic device 100, or may be phrases having a predetermined length set by the user. For example, when "Hi, TV" is the predetermined phrase stored as the trigger voice, the electronic device 100 determines whether the received user's voice is "Hi, TV". When it is determined that the received user voice is "Hi, TV" (S510—Y), the electronic device 100 changes its mode of operation to a voice recognition mode (S520).

On the other hand, when a user's voice is received through an external device such as a remote controller, the electronic device 100 recognizes that a user voice first received after pressing an input button provided on the external device is the trigger voice. For example, if "Hi, TV" is the predetermined phrase stored as the trigger voice, when "Channel thirteen" is first input after pressing the input button on the external device, the electronic device 100 recognizes "Channel thirteen" as the trigger voice.

If it is determined that the received user's voice is not the trigger voice (S510-N), the electronic device 100 does not change its mode of operation to a voice recognition mode and the process goes back to step S500.

Subsequently, the electronic device 100 analyzes the user voice determined to be the trigger voice, and stores characteristics of the user's voice (S530). More specifically, the characteristics of the user voice may include user's voice condition and voice environment. The user voice condition may include energy of the user's voice, and frequency band distribution of the user's voice. The voice environment may include a reverberation time (RT) while the user's voice is being input, or a voice signal to noise ratio (SNR). That is, the characteristics of the user's voice may include energy of the user's voice, frequency band distribution of the user's voice, a reverberation time (RT) while the user's voice is being input, or a voice signal to noise ratio (SNR).

If a voice command is input to control the electronic device 100 (S540—Y), the electronic device 100 analyzes the voice command, and compares characteristics of the voice command with the stored characteristics of the user's voice (S550). The voice command may include all of the users' voices to control functions of the electronic device 100. In addition, the electronic device 100 may recognize a user's voice having more than a predetermined energy as a voice command and analyze the user's voice.

Subsequently, the electronic device 100 performs a function corresponding to the voice command based on the comparison results (S560). More specifically, when data acquired by analyzing at least one of energy, frequency bandwidth, an RT while the voice command is being input, and a voice SNR of the voice command are within a predetermined range of data acquired by analyzing at least one of energy, frequency bandwidth, an RT while the trigger voice is being input, and a voice SNR of the user's voice corresponding to the trigger voice, the electronic device 100 performs a function corresponding to the voice command.

For example, if an input user voice, "Hi, TV", is determined to be the trigger voice, the electronic device 100 changes its mode of operation to a voice recognition mode, energy of "Hi, TV" and an RT while inputting "Hi, TV" are stored as characteristics of the user's voice, and following that the electronic device 100 receives a voice command, "Channel thirteen".

The electronic device 100 analyzes energy of the input voice command, "Channel thirteen", and an RT while the voice command is input. When the analyzed data are within a margin of error of 10% of data regarding the stored characteristics of the user's voice corresponding to the trigger voice, the electronic device 100 may determine that the user who issued the trigger voice is the same as the user who issued the voice command. In addition, the electronic device 100 may determine that the input voice command represents the user's intentions regarding control of the electronic device 100. Accordingly, the electronic device 100 changes the channel to channel 13, according to an exemplary embodiment.

The margin of error of 10% for the comparison data is merely an exemplary embodiment. The margin of error may vary according to initial setting or environment.

In addition, voice energy and an RT are merely an example of characteristics of user's voice. Any value that varies according to users or voice environment, such as Frequency band distribution, an RT while inputting a voice, and a voice SNR, may be analyzed and stored as a condition for recognizing a user's voice, according to different exemplary embodiments.

Figure 6:
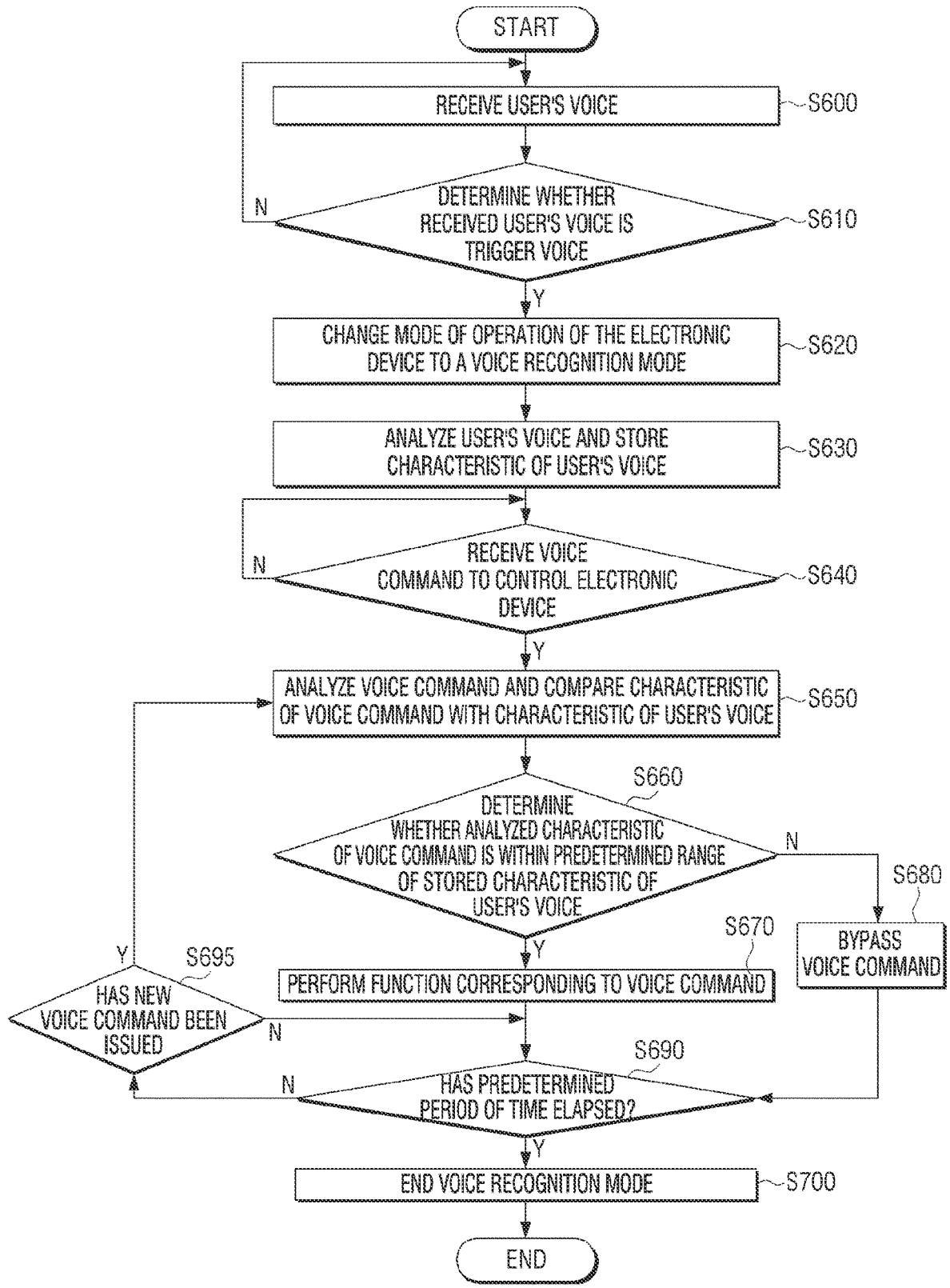
FIG. 6 is a flow chart describing a method for analyzing user's voice, performing voice recognition, and finishing the process of voice recognition according to an exemplary embodiment.

FIG. 6 is a flow chart describing a method for analyzing user's voice, performing voice recognition, and finishing the process of voice recognition according to an exemplary embodiment.

First, the electronic device 100 receives a user's voice (S600). The electronic device 100 may receive a user's voice through a microphone included in the electronic device 100 or through a microphone included in an external device such as a remote controller.

The electronic device 100 determines whether the received user's voice is the trigger voice (S610). The trigger voice may be a voice to change the mode of operation of the electronic device 100 to a voice recognition mode to perform voice recognition. In addition, the trigger voice may be a predetermined word/phrase stored in the electronic device 100, or may a phrase having a predetermined length set by the user. For example, when "Hi, TV" is the predetermined phrase stored as the trigger voice, the electronic device 100 determines whether the received user's voice input is "Hi, TV". When it is determined that the received user's voice input is "Hi, TV" (S610—Y), the electronic device 100 changes its mode of operation to a voice recognition mode (S620).

On the other hand, when a user voice is received through an external device such as a remote controller, the electronic device 100 recognizes that a user voice first received after pressing an input button provided on the external device is the trigger voice. For example, if "Hi, TV" is the predetermined phrase stored as the trigger voice when "Channel thirteen" is first input after pressing the input button on the external device, the electronic device 100 recognizes "Channel thirteen" as the trigger voice.

If it is determined that the received user's voice is not the trigger voice (S610-N), the electronic device 100 does not change its mode of operation to a voice recognition mode and the process goes back to step S600.

Subsequently, the electronic device 100 analyzes the user voice determined to be the trigger voice, and stores characteristics of the user's voice (S630). More specifically, the characteristics of the user's voice may include user's voice condition and voice environment. The user's voice condition may include energy of the user's voice, and frequency band distribution of the user's voice. The voice environment may include a reverberation time (RT) while the voice is being input, or a voice signal to noise ratio (SNR). That is, the characteristics of the user's voice may include energy of the user's voice, frequency band distribution of the user's voice, a reverberation time (RT) while the voice is being input, or a voice signal to noise ratio (SNR).

When a voice command is input to control the electronic device 100 (S640—Y), the electronic device 100 analyzes the voice command, and compares analyzed characteristics of the voice with the characteristics of the user voice (S650). The voice command may include all of the users' voices to control functions of the electronic device 100. In addition, the electronic device 100 may recognize a user's voice having more than a predetermined energy as a voice command, and analyze the user's voice. If the voice command is not received to control the electronic device 100 (S640-N), the electronic device 100 waits to receive the voice command.

When the analyzed characteristics of the voice command are within a predetermined range of the stored characteristics of the user's voice (S660—Y), the electronic device 100 performs a function corresponding to the voice command (S670).

When the analyzed characteristics of the voice command is out of a predetermined range of the stored characteristics of the user's voice (S660-N), the electronic device 100 bypasses the voice command (S680).

For example, if an input user voice, "Hi, TV", is determined to be the trigger voice, the electronic device 100 changes its mode of operation to a voice recognition mode, energy of "Hi, TV" and an RT while "Hi, TV" voice is being input are stored as characteristics of the user's voice, and the electronic device 100 receives a voice command, "Channel thirteen".

The electronic device 100 analyzes energy of the input voice command "Channel thirteen" and an RT while the voice command is being input. When the analyzed data is within a margin of error of 10% of data regarding the stored characteristics of the user's voice corresponding to the trigger voice, the electronic device 100 may determine that the user who issued the trigger voice is the same as the user who issued the voice command, according to an exemplary embodiment. In addition, the electronic device 100 may determine that the input voice command corresponds to the intentions of the user to control the electronic device 100. Accordingly, the electronic device 100 changes the channel to channel 13.

However, when the data acquired by analyzing energy of the input control voice "Channel thirteen" and an RT while the voice command is being input are out of a margin of error of 10% of the data acquired by analyzing energy of the trigger voice "Hi, TV" and an RT the trigger voice is being input, the electronic device 100 may bypass the input control voice "Channel thirteen". Accordingly, the electronic device 100 does not change the channel.

The margin of error of 10% for the comparison data is merely an exemplary embodiment, and is not limited thereto. The margin of error may vary according to initial setting or environment.

In addition, voice energy and an RT are merely examples of characteristics of a user's voice. Any value that varies according to users or voice environment, such as Frequency band distribution, an RT while a voice is being input, and a voice SNR, may be analyzed and stored as a condition for recognizing a user's voice.

After a predetermined period of time has elapsed (S690—Y), the electronic device 100 finishes the voice recognition session by ending the voice recognition mode (S700). That is, when another voice command is not input during a predetermined period of time after performing the function corresponding to a previous voice command, the electronic device 100 automatically ends the voice recognition mode without input of a user command to finish voice recognition mode. Accordingly, after the voice recognition mode has been ended and the electronic device 100 has ended the session of voice recognition, the electronic device 100 does not respond to an input of user's voice until a user's voice is determined to be the trigger voice.

However, if a predetermined amount of time has not elapsed (S690-N), it is determined if another voice command has been issued by the user (S695). If a voice command has been issued by the user, the process moves to step S650 where the voice command is analyzed and its characteristics compared with the stored characteristics of the user's voice followed by the rest of the process described above. However, if no voice command is issued, the process again moved to step S690 where it is determined if a predetermined amount of time has elapsed.

According to the aforementioned voice recognition method, the user may easily control functions of the electronic device 100 without error by issuing a voice command without separate manipulation/input.

The voice recognition methods of the electronic device 100 according to the diverse exemplary embodiments described above may be coded as software and be stored in a non-transitory computer readable medium. The non-transitory computer readable medium may be mounted in several different types of devices.

For example, a program code to, when a user's voice is input, determine whether the input user's voice is a trigger voice, when it is determined that the input user's voice is the trigger voice, changing the mode of operation of the electronic device to a voice recognition mode, analyzing the user's voice, and storing characteristics of the user's voice, and when a voice command is input to control the electronic device, analyzing the voice command, comparing analyzed characteristics of the voice command with the stored characteristics of the user's voice, and performing a function corresponding to the voice command based on the comparison results, may be stored in a non-transitory computer readable medium.

The non-transitory computer readable medium is a medium which does not store data temporarily such as a register, cash, and memory but stores data semi-permanently and is readable by devices. More specifically, the non-transitory computer readable medium may be compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting. The present teaching can be readily applied to other types of apparatuses. Also, the description of the exemplary embodiments are intended to be illustrative, and not to limit the scope of the claims, and many alternatives, modifications, and variations will be apparent to those skilled in the art.

What is claimed is:

1. An electronic device comprising:
a receiver configured to receive a data including a content;
a microphone;
a communicator; and
a processor configured to:
process the received data for displaying the content on a screen,
based on a first user voice input being received through the microphone while the content is displayed on the screen, identify whether the first user voice input corresponds to a trigger voice,
based on the first user voice input corresponding to the trigger voice, change a mode of the electronic device to a voice recognition mode and display a first user interface (UI) indicating that the electronic device is in the voice recognition mode, and
based on a button of an external device being pressed and a second user voice input being received through the communicator from the external device after the button of the external device is pressed, change the mode of the electronic device to the voice recognition mode without identifying whether the second user voice input corresponds to the trigger voice and display a second UI indicating that electronic device is in the voice recognition mode and a third UI indicating that the second user voice input is being recognized in the voice recognition mode,
wherein the trigger voice is a predetermined phrase set by a user.

2. The electronic device of claim 1, wherein the first UI, the second UI and the third UI are displayed in a first area of the screen and the content is displayed in a second area of the screen.

3. The electronic device of claim 1, wherein the second user voice input is received from the external device within a predetermined time from when a signal is received from the external device through the communicator as the button of the external device is pressed.

4. The electronic device of claim 1, wherein based on the second user voice input being not received from the external device within a predetermined time from when a signal is received from the external device through the communicator as the button of the external device is pressed, the processor is configured to terminate the voice recognition mode.

5. The electronic device of claim 1, wherein the second user voice input is a voice input for controlling a function of the electronic device, and
wherein the processor is configured to perform the function corresponding to the second user voice input.

6. The electronic device of claim 1, wherein the second user voice input is inputted to a microphone of the external device.

7. A voice recognition method of an electronic device, the method comprising:
receiving a data including a content;
processing the received data for displaying the content on a screen;

based on a user voice input being received through a microphone of the electronic device while the content is displayed on the screen, identifying whether the user voice input is corresponding to a trigger voice input;

based on the user voice input corresponding to the trigger voice, changing a mode of the electronic device to a voice recognition mode and displaying a first user interface (UI) indicating that the electronic device is in the voice recognition mode; and based on a button of an external device being pressed and a second user voice input being received from the external device after the button of the external device is pressed, changing the mode of the electronic device to the voice recognition mode without identifying whether the second user voice input corresponds to the trigger voice and displaying a second UI indicating that the electronic device is in the voice recognition mode and a third UI indicating that the second user voice input is being processed in the voice recognition mode, wherein the trigger voice is a predetermined phrase set by a user.

8. The method of claim 7, wherein the first UI, the second first and the third UI are displayed in a first area of the screen and the content is displayed in a second area of the screen.

9. The method of claim 7, wherein the second user voice input is received from the external device within a predetermined time from when a signal is received from the external device as the button of the external device is pressed.

10. The method of claim 7, wherein, based on the second user voice input being not received from the external device within a predetermined time from when a signal is received from the external device through a communicator as the button of the external device is pressed, the voice recognition mode is terminated.

11. The method of claim 7, wherein the second user voice input is a voice input for controlling a function of the electronic device.

12. The method of claim 7, wherein the second user voice input is inputted to a microphone of the external device.

\* \* \* \* \*